US012789558B2

(12) United States Patent
Saeki et al.

(10) Patent No.: US 12,789,558 B2
(45) Date of Patent: Nov. 10, 2026

(54) TIRE

(71) Applicant: Sumitomo Rubber Industries, Ltd., Kobe (JP)

(72) Inventors: Tetsuro Saeki, Kobe (JP); Koki Nagasawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 54 days.

(21) Appl. No.: 18/948,740

(22) Filed: Nov. 15, 2024

(65) Prior Publication Data

US 2025/0196541 A1 Jun. 19, 2025

(30) Foreign Application Priority Data

Dec. 15, 2023 (JP) ................................ 2023-212336

(51) Int. Cl.
*B60C 11/03* (2006.01)

(52) U.S. Cl.
CPC ... *B60C 11/0306* (2013.01); *B60C 2011/0341* (2013.01); *B60C 2011/0346* (2013.01); *B60C 2011/0358* (2013.01)

(58) Field of Classification Search
CPC ......... B60C 2011/0346; B60C 11/0306; B60C 2011/0341; B60C 2011/0358
See application file for complete search history.

(56) References Cited

U.S. PATENT DOCUMENTS 4,945,963 A * 8/1990 Fujiwara ................ B60C 11/01
152/902
10,363,780 B2 7/2019 Takayama
10,723,178 B2 7/2020 Nishiwaki
2017/0225514 A1 8/2017 Iwata
2018/0312009 A1 11/2018 Wada
2019/0054775 A1* 2/2019 Muller ................ B60C 11/0306
2019/0202242 A1* 7/2019 Kagimoto ........... B60C 11/1307
2022/0169077 A1* 6/2022 Kitamura .............. B60C 1/0016

FOREIGN PATENT DOCUMENTS

JP H11245630 A * 9/1999 ............. B60C 11/12
JP 2009096220 A * 5/2009 ........... B60C 11/033
JP 2018-149978 A 9/2018

OTHER PUBLICATIONS

Extended European Search Report for European Application No. 24216414.3, dated Mar. 27, 2025.

* cited by examiner

*Primary Examiner* — Justin R Fischer
*Assistant Examiner* — Philip N Schwartz
(74) *Attorney, Agent, or Firm* — Birch, Stewart, Kolasch & Birch, LLP

(57) ABSTRACT

A tire has a tread portion comprises four circumferential grooves and five land portions. The four circumferential grooves include a first shoulder circumferential groove, a second shoulder circumferential groove, a first crown circumferential groove and a second crown circumferential groove. The five land portions include a first middle land portion, a second middle land portion and a crown land portion. The first middle land portion is provided with first middle lateral grooves. The second middle land portion is provided with second middle lateral grooves. In a plan view of the tread portion, a first end of each first middle lateral groove overlaps with a first virtual zone, and a second end of each first middle lateral groove overlaps with a second virtual zone.

18 Claims, 5 Drawing Sheets

TIRE

TECHNICAL FIELD

The present disclosure relates to a tire.

BACKGROUND ART

Patent Document 1 below discloses a tire with tread blocks whose shapes are improved for mud performance, wet performance, and steering stability performance on dry road surfaces.

Patent Document 1: Japanese Patent Application Publication No. 2018-149978

SUMMARY OF THE INVENTION

Problems to be Solved by the Invention

With the tightening of regulations on vehicle running noise in recent years, improvements in noise performance are required even for tires designed to be stability used on muddy terrain, such as the tires mentioned above.

The present disclosure was made in view of the above circumstances, and a primary objective of the present disclosure is to provide a tire improved in noise performance while maintaining excellent mud performance.

Means for Solving the Problems

According to the present disclosure, a tire comprises:

a tread portion having a first tread edge and a second tread edge, and provided with four circumferential grooves disposed between the first and second tread edges and extending continuously in a tire circumferential direction so that the tread portion is axially divided into five land portions, wherein the four circumferential grooves are a first shoulder circumferential groove closest to the first tread edge, a second shoulder circumferential groove closest to the second tread edge, a first crown circumferential groove between the first shoulder circumferential groove and a tire equator, and a second crown circumferential groove between the second shoulder circumferential groove and the tire equator, the five land portions include a first middle land portion between the first shoulder circumferential groove and the first crown circumferential groove, a second middle land portion between the second shoulder circumferential groove and the second crown circumferential groove, and a crown land portion between the first crown circumferential groove and the second crown circumferential groove, the first middle land portion is provided with first middle lateral grooves extending across an entire axial width thereof, the second middle land portion is provided with second middle lateral grooves extending across an entire axial width thereof, each of the first middle lateral grooves and the second middle lateral grooves is inclined with respect to the tire axial direction so as to have a first end on a first side in the tire circumferential direction and a second end on a second side in the tire circumferential direction, in a plan view of the tread portion, the first ends of the first middle lateral grooves respectively overlap first virtual zones formed by extending the second ends of the second middle lateral groove to the first middle land portion in parallel with the tire axial direction, and the second ends of the first middle lateral grooves respectively overlap second virtual zones formed by extending the first ends of the second middle lateral grooves to the first middle land portion in parallel with the tire axial direction.

Here, the "virtual zone" is, in other words, the trace left when the circumferential width of the groove end is moved parallel to the tire axis direction.

Effects of the Invention

By having the above configuration, the tire of the present disclosure can be improved in noise performance while maintaining mud performance.

DETAILED DESCRIPTION OF THE INVENTION

An embodiment of the present disclosure will now be described in detail in conjunction with accompanying drawings.

It is to be noted that, in order to aid understanding of the present disclosure, the drawings may include expressions exaggerated or different from the actual dimensional ratio of the structure.

Figure 1:
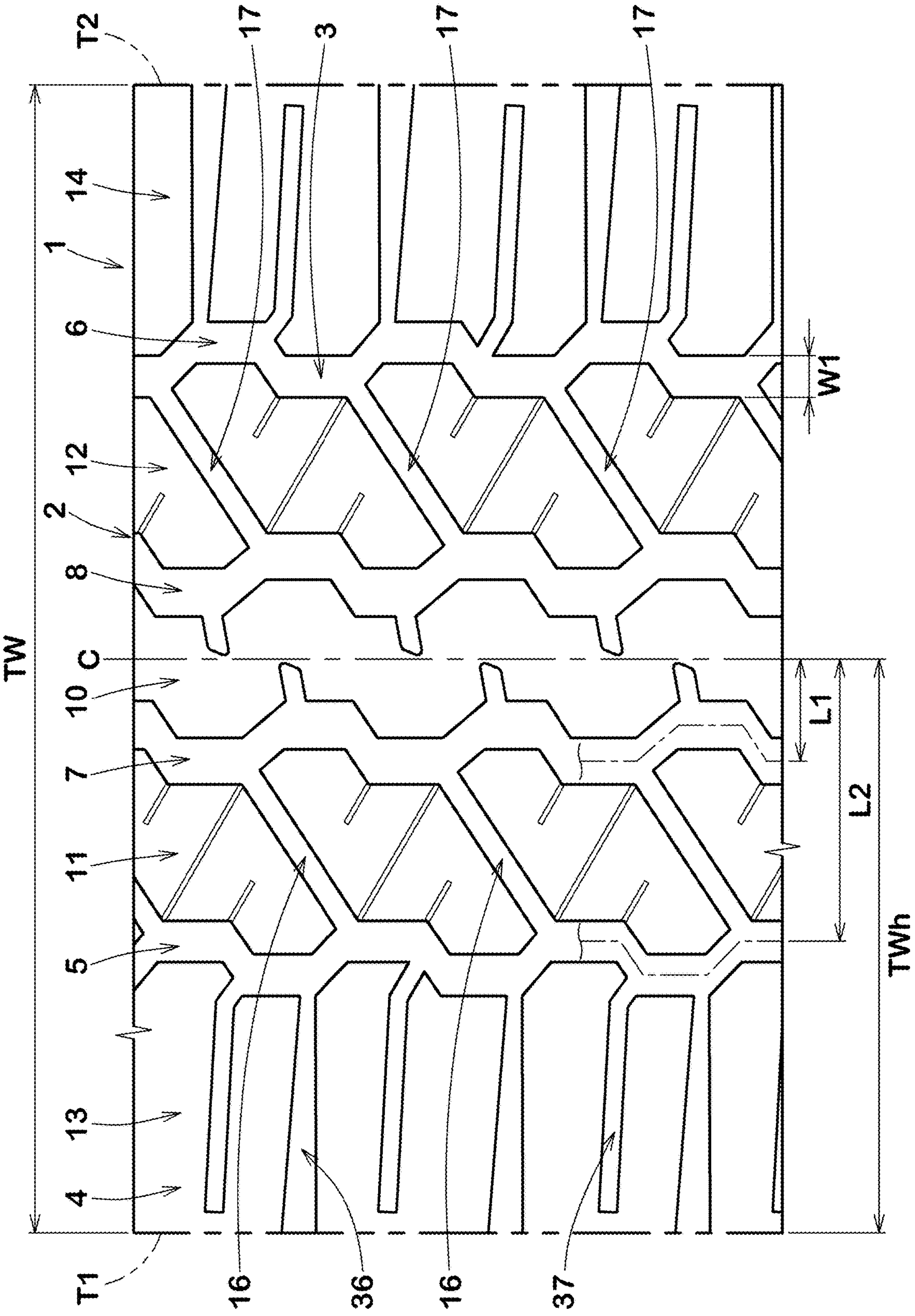
FIG. 1 is a developed partial view of a tread portion of a tire as an embodiment of the present disclosure.

FIG. 1 is a developed partial view of a tread portion 2 of a tire 1 as an embodiment of the present disclosure.

In the present embodiment, the tire 1 is a pneumatic tire designed to be suitable for use in four-wheel drive vehicles such as SUVs so as to run not only on paved roads but also off-road such as muddy terrains and rocky terrain.

However, application of the present disclosure is not limited to tires such as in the present embodiment.

The tread portion 2 has a pair of tread edges: a first tread edge T1 and a second tread edge T2.

In the present embodiment, as shown in FIG. 1, the tread portion 2 is provided with four circumferential grooves 3 continuously extending in the tire circumferential direction, and thereby, the tread portion 2 is axially divided into five land portions 4.

In the present disclosure, the tread edges T1 and T2 are the axial outermost edges of the ground contacting patch of the tire which occurs when the tire under its normal state is contacted with a flat horizontal surface at a camber angle of 0 degrees and is loaded with 58% of the normal tire load for the tire.

When the tire 1 is a pneumatic tire for which various standards have been established, the normal state of the tire 1 is such that the tire is mounted on a normal rim, and inflated to a normal pressure, but loaded with no tire load.

When the tire 1 is a pneumatic tire or non-pneumatic tire for which various standards are not yet established, the normal state of the tire 1 is such that the tire is put under a standard usage condition according to the purpose of use of the tire, but not yet attached to the vehicle and loaded with no tire load.

In this application including specification and claims, various dimensions, positions and the like of the tire refer to those under the normal state unless otherwise noted.

The above-mentioned normal rim is a wheel rim officially approved or recommended for the tire by the standardization organization on which the tire is based, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The above-mentioned normal pressure is the maximum air pressure officially approved or recommended for the tire by the standardization organization on which the tire is based, for example, the "maximum air pressure" in JATMA, the maximum pressure given in the "Tire Load Limits at Various Cold Inflation Pressures" table in TRA, the "Inflation Pressure" in ETRTO, or the like.

When the tire 1 is a pneumatic tire for which various standards have been established, the normal tire load is the maximum tire load officially approved or recommended for the tire by the same standardization organization and specified in the Air-pressure/Maximum-load Table or similar list, for example, the "maximum air pressure" in JATMA, the "Inflation Pressure" in ETRTO, the maximum pressure given in the "Tire Load Limits at Various Cold Inflation Pressures" table in TRA or the like.

When the tire 1 is a pneumatic tire or non-pneumatic tire for which various standards are not yet established, the normal tire load is the maximum tire load recommended for the tire by the tire manufacturer.

The four circumferential grooves 3 are a first shoulder circumferential groove 5, a second shoulder circumferential groove 6, a first crown circumferential groove 7, and a second crown circumferential groove 8.

Among the four circumferential grooves 3, the first shoulder circumferential groove 5 is located closest to the first tread edge T1, and the second shoulder circumferential groove 6 is located closest to the second tread edge T2.

The first crown circumferential groove 7 is located between the first shoulder circumferential groove 5 and the tire equator C.

The second crown circumferential groove 8 is located between the second shoulder circumferential groove 6 and the tire equator C.

It is preferable that the groove widths W1 of the circumferential grooves 3 are at least 3 mm.

Preferably, the groove widths W1 are not less than 3.0% and not more than 7.0% of the tread width TW.

Here, the tread width TW corresponds to the distance in the tire axial direction from the first tread edge T1 to the second tread edge T2 in the normal state.

The depths of the circumferential grooves 3 are preferably 5 to 10 mm in the case that the tire 1 is of a passenger car tire size.

Note that when numerical ranges for various parameters are described in this specification, unless otherwise specified, the numerical ranges mean the numerical ranges for the average values of the parameters.

The five land portions 4 are:

- a crown land portion 10 between a first crown circumferential groove 7 and a second crown circumferential groove 8;
- a first middle land portion 11 between the first shoulder circumferential groove 5 and the first crown circumferential groove 7;
- a second middle land portion 12 between the second shoulder circumferential groove 6 and the second crown circumferential groove 8;
- a first shoulder land portion 13 between the first shoulder circumferential groove 5 and the first tread edge T1; and
- a second shoulder land portion 14 between the second shoulder circumferential groove 6 and the second tread edge T2.

In the present embodiment, the crown land portion 10 is located on the tire equator C.

Figure 2:
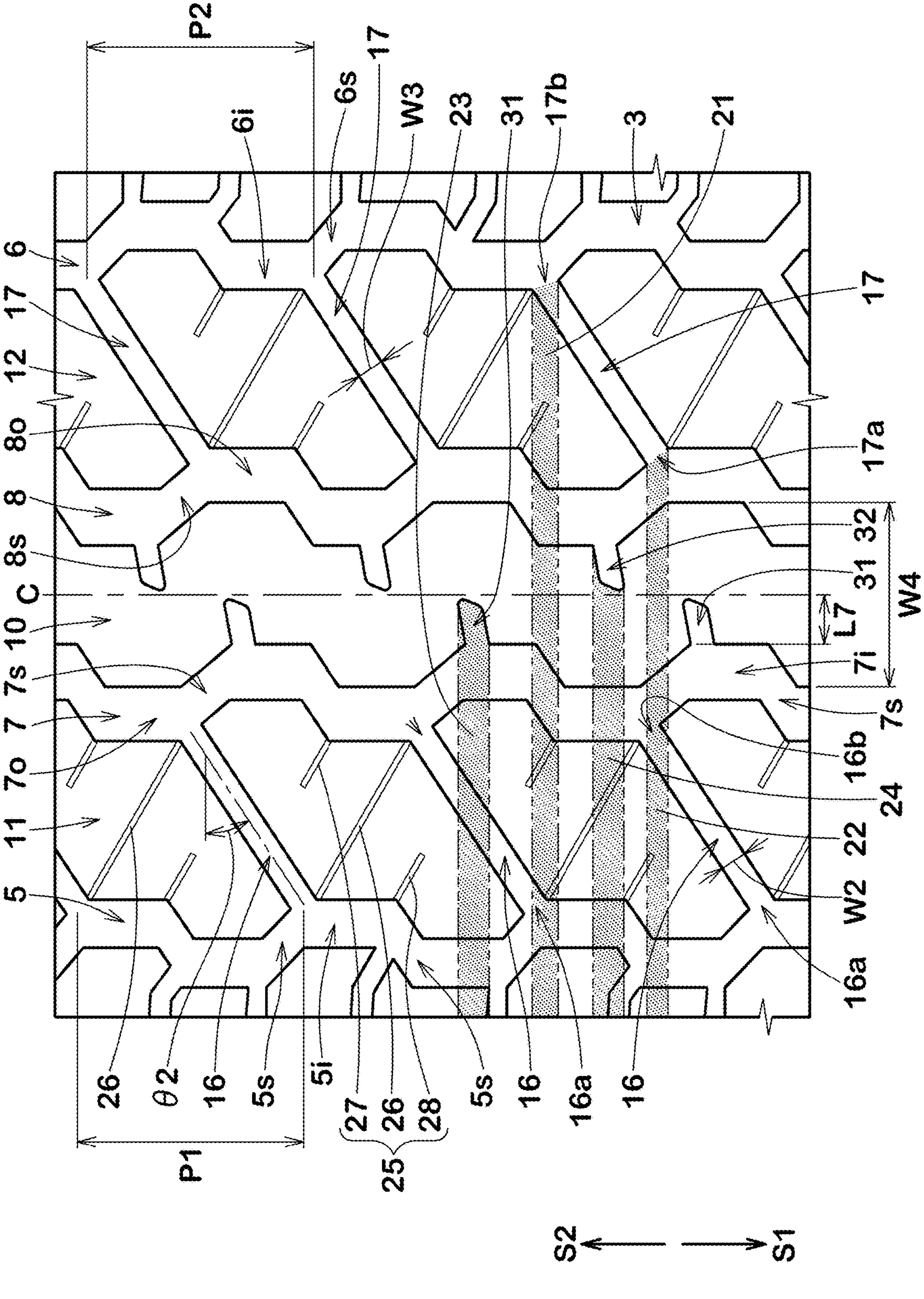
FIG. 2 is a developed partial view of the tread portion showing the crown land portion, first middle land portion, and second middle land portion in FIG. 1.

FIG. 2 shows the crown land portion 10, the first middle land portion 11, and the second middle land portion 12.

As shown, the first middle land portion 11 is provided with a plurality of first middle lateral grooves 16.

The first middle lateral grooves 16 each extend across the entire axial width of the first middle land portion 11.

Further, the second middle land portion 12 is provided with a plurality of second middle lateral grooves 17.

The second middle lateral grooves 17 each extend across the entire axial width of the second middle land portion 12.

The first middle lateral grooves 16 and the second middle lateral grooves 17 are each inclined with respect to the tire axial direction.

In the present embodiment, the first middle lateral grooves 16 and the second middle lateral grooves 17 are inclined in a same direction with respect to the tire axial direction.

However, it is also possible that the first middle lateral grooves 16 are inclined in one direction with respect to the tire axial direction, and the second middle lateral grooves 17 are inclined in one direction with respect to the tire axial direction which is different from the first middle lateral grooves 16.

Since the first middle lateral grooves 16 and the second middle lateral grooves 17 are inclined as described above, each of these grooves 16 and 17 has its first end and second end respectively located on one side (first side S1) and the other side (second side S2) in the tire circumferential direction. In the figures, the first side S1 is in the downward direction, and the second side S2 is in the upward direction.

More specifically, each first middle lateral groove 16 has a first end 16*a* on the first side S1 and a second end 16*b* on the second side S2 in the tire circumferential direction, and each second middle lateral groove 17 has a first end 17*a* on the first side S1 and a second end 17*b* on the second side S2 in the tire circumferential direction.

These ends are opened to the adjacent circumferential grooves 3.

Figure 3:
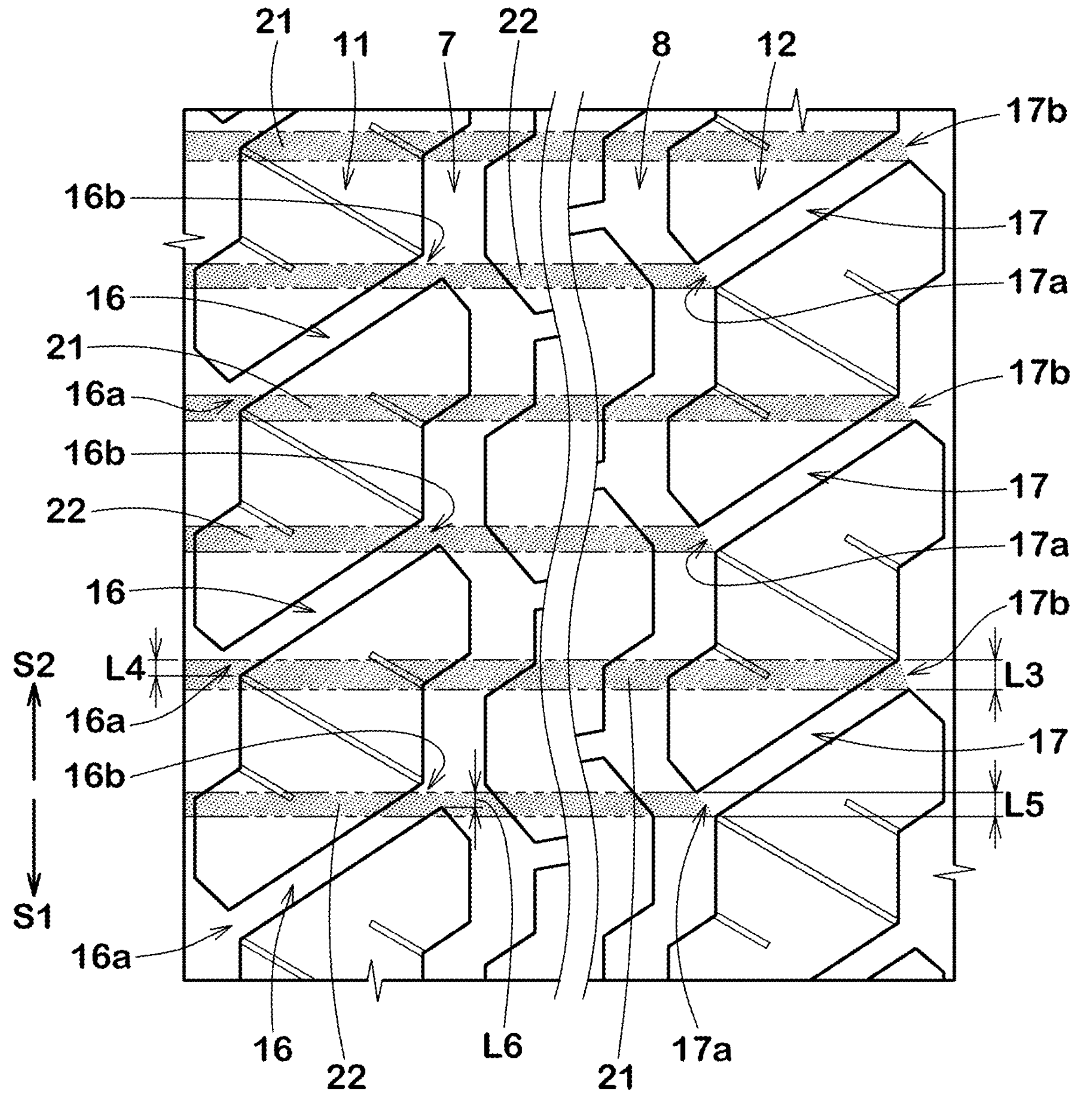
FIG. 3 is a developed partial view of the tread portion showing the first middle land portion and the second middle land portion in FIG. 2.

FIG. 3 shows the first middle land portion 11 and the second middle land portion 12, omitting the crown portion land 10.

As shown in FIG. 3, in the plan view of the tread portion 2, the first end 16*a* of each first middle lateral groove 16 overlaps with a first virtual zone 21 formed by extending the second end 17*b* of one of the second middle lateral grooves 17 to the first middle land portion 11 in parallel with the tire axial direction, and the second end 16*b* of each first middle lateral grooves 16 overlaps with a second virtual zone 22 formed by extending the first end 17*a* of one of the second middle lateral grooves 17 to the first middle land portion 11 in parallel with the tire axial direction.

By having such positional relationship, the tire 1 according to the present disclosure can be improved in noise performance while maintaining mud performance.

The reason is as follows.

As described above, in the tire 1 of the present disclosure, the tread portion 2 is provided with four circumferential grooves 3. Further, the first middle land portion 11 is provided with the first middle lateral grooves 16, and the second middle land portion 12 is provided with the second middle lateral grooves 17.

Such various grooves provide reaction forces in multiple directions when running on mud terrain, and help to maintain mud performance.

On the other hand, so-called pitch sound has been known as a noise generated from a tire when running.

One of the causes of such pitch sound is impact force generated when lateral grooves extending in the tire axial direction contact a road surface.

Such impact force causes the tread portion and sidewall portions (not shown) to vibrate periodically which may generate pitch sound.

In the present disclosure, since the first middle lateral grooves 16 and the second middle lateral grooves 17 are arranged as described above, it becomes possible for the first middle lateral grooves 16 and the second middle lateral grooves 17 to alternately and thereby continuously contact with the ground when running, and as a result, the pulsation of the impact force described above can be reduced. In the tire 1 of the present disclosure, therefore, pitch noise caused by impact force can be reduced, and the noise performance can be improved.

Hereinafter, a more detailed configuration of the tire 1 according to the present embodiment will be described. Each of the configurations described below is a specific form of the present embodiment. It goes without saying, therefore, that the present disclosure can achieve the effects described above even if it does not have the configurations described below. Even if any one of the configurations described below is applied alone to the tire 1 of the present disclosure, which is equipped with the features described above, an improvement in performance according to each of the configurations can be expected. Furthermore, when some of the configurations described below are applied in combination, a combined improvement in performance according to each configuration can be expected.

In the present embodiment, the tread portion 2 is provided with a tread pattern which is substantially point symmetrical with respect to a point on the tire equator C as shown in FIG. 1. Here, the expression "substantially" means that the tread pattern is not strictly point symmetric when a so-called pitch variation technique is employed. Accordingly, below descriptions for components (such as grooves, sipes and ground contacting elements) located on the first tread edge T1 side of the tire equator C, can be applied to corresponding components located on the second tread edge T2 side of the tire equator C mutatis mutandis.

Figure 4:
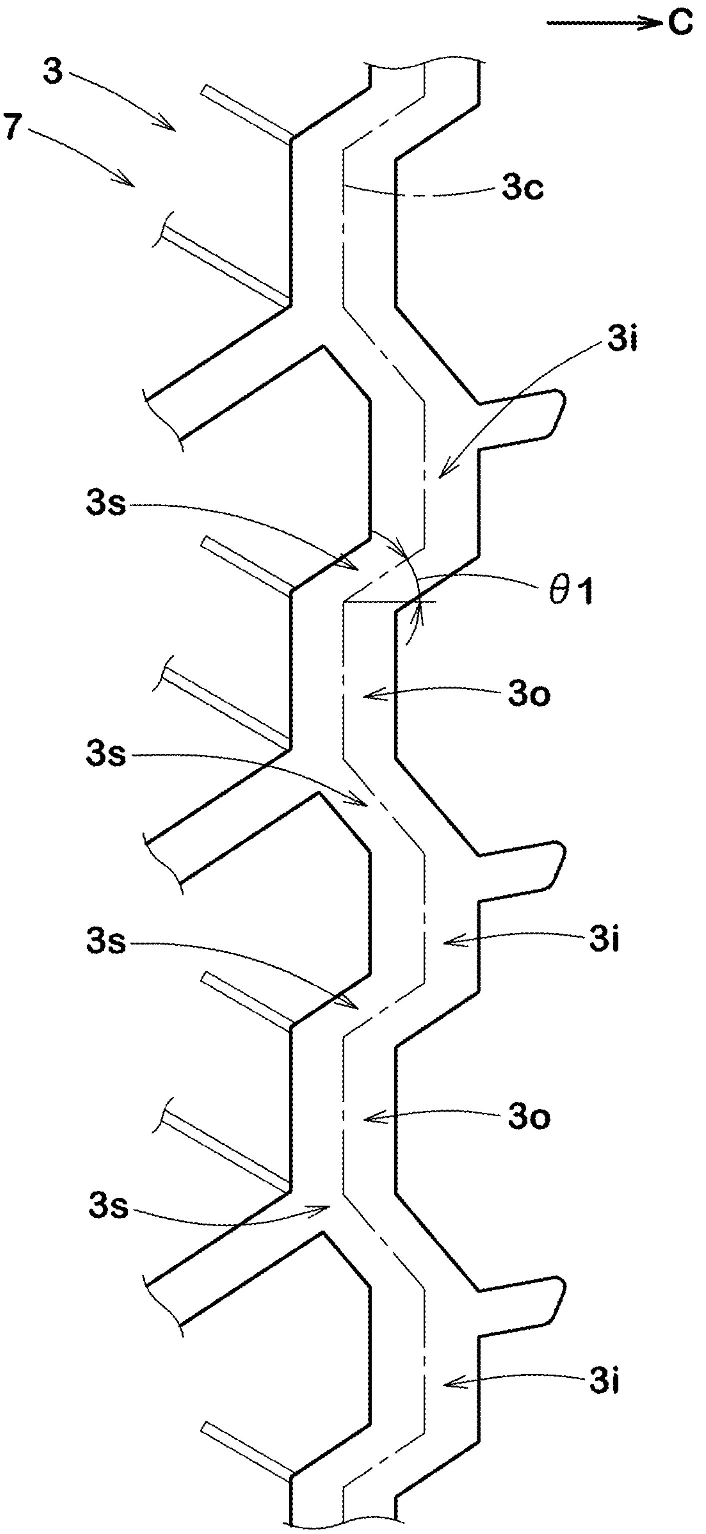
FIG. 4 is an enlarged partial view showing the first crown circumferential groove.

Taking the first crown circumferential groove 7 shown in FIG. 4 as an example of the circumferential grooves 3, the configuration of the circumferential groove 3 will be described below. The description below can be applied to not only the first crown circumferential groove 7, but also the second crown circumferential groove 8, the first shoulder circumferential groove 5 and the second shoulder circumferential groove 6.

The circumferential groove 3 extends in a zigzag shape. But, the circumferential groove 3 may be extended linearly in parallel with the tire circumferential direction.

When the circumferential groove 3 extends in a zigzag shape as in the present embodiment, the circumferential groove 3 may take various forms such that the center line 3*c* of the groove is in a triangular waveform, a sine waveform, a trapezoidal waveform or the like.

In the present embodiment, the center line 3*c* of the circumferential groove 3 is formed in a trapezoidal waveform.

This can improve not only mud performance but also running performance on rocky terrain with relatively large rocks.

The circumferential groove 3 comprises axially inner groove segments 3*i*, axially outer groove segments 30, and oblique groove segments 3*s*.

The axially inner groove segments 3*i* each extend linearly in the tire circumferential direction on the tire equator C side.

The axially outer groove segments 30 each extends linearly in the tire circumferential direction on the axially outer side of the axially inner groove segments 3*i*.

The oblique groove segments 3*s* connects between the axially inner groove segments 3*i* and the axially outer groove segments 30.

The angle θ1 of each oblique groove segment 3*s* is, for example, 40 to 60 degrees with respect to the tire axial direction.

The axially inner groove segments 3*i* and the axially outer groove segments 30 in the present embodiment each extend in parallel with the tire circumferential direction, but are not to be limited to such an arrangement.

As shown in FIG. 1, the distance L1 in the tire axial direction from the tire equator C to the center line of the first crown circumferential groove 7 is 5% to 20% of a half tread width TWh. The half tread width TWh is a half of the tread width TW between the first and second tread edges T1 and T2, corresponding to the distance in the tire axial direction from the tire equator C to the first tread edge T1 or second tread edge T2.

In the present embodiment, as the first shoulder circumferential groove 5 extends in a zigzag shape, its center line extends in the tire circumferential direction while oscillating in the tire axial direction within the above-mentioned range.

Similarly, the distance in the tire axial direction from the tire equator C to the center line of the second crown circumferential groove 8 is 5% to 20% of the half tread width TWh.

The distance L2 in the tire axial direction from the tire equator C to the center line of the first shoulder circumferential groove 5 is 45% to 55% of the half tread width TWh.

The distance in the tire axial direction from the tire equator C to the center line of the second shoulder circumferential groove 6 is 45% to 55% of the half tread width TWh.

By arranging the circumferential grooves 3 in this manner, it is possible to improve mud performance while suppressing chipping-off of the land portions.

As shown in FIG. 2, the first middle lateral grooves 16 and the second middle lateral grooves 17 are inclined in a first direction with respect to the tire axis direction (upward slope to the right in the figures of the present embodiment).

In the present embodiment, the first middle lateral groove 16 and the second middle lateral groove 17 extend linearly with the above-mentioned slope, but they are not limited to such arrangement.

Further, the first middle lateral grooves 16 and the second middle lateral grooves 17 are each inclined at an angle θ2 of from 20 to 60 degrees with respect to the tire axial direction.

The angle θ2 is preferably not less than 30 degrees, more preferably not less than 35 degrees, but preferably not more than 50 degrees, more preferably not more than 45 degrees.

These first middle lateral grooves 16 and second middle lateral grooves 17 can easily discharge mud and soil entered in the grooves when the vehicle is running on muddy terrain. Therefore, excellent mud performance can be continuously exhibited.

The first middle lateral groove 16 has a groove width W2 which is constant in its longitudinal direction.

The groove width W2 of the first middle lateral groove 16 is 5% to 20%, preferably 10% to 15% of the average value of pitch lengths P1 of the first middle lateral grooves 16 in the tire circumferential direction.

Similarly, the groove width W3 of the second middle lateral groove 17 is 5% to 20%, preferably 10% to 15% of the average value of pitch lengths P2 of the second middle lateral grooves 17 in the tire circumferential direction.

Thereby, mud performance and steering stability on dry roads (hereinafter simply referred to as "steering stability") can be improved in a well-balanced manner.

As shown in FIG. 3, even if at least a portion of the first end 16*a* of the first middle lateral groove 16 overlaps with the first virtual zone 21, the above-described effects can be expected.

From the viewpoint of further enhancing the above-mentioned effects, the overlapping length L4 in the tire circumferential direction of the first end 16*a* of the first middle lateral groove 16 with the first virtual zone 21 is preferably 30% to 100%, more preferably 60% to 100% of the length L3 in the tire circumferential direction of the first virtual zone 21. Similarly, the overlapping length L6 in the tire circumferential direction of the second end 16*b* of the first middle lateral groove 16 with the second virtual zone 22 is preferably 30% to 100%, more preferably 60% to 100% of the length L5 in the tire circumferential direction of the second virtual zone 22.

As shown in FIG. 2, each of the first middle lateral grooves 16 is connected to one of connection positions between the axially outer groove segments 70 and the oblique groove segments 7*s* of the first crown circumferential groove 7 so that the angle between the first middle lateral groove 16 and the axially outer groove segment 70 is an obtuse angle.

As a result, when running on muddy terrain, mud and soil can be strongly compacted in the connection positions of these grooves, and the mud performance can be further improved. From the same point of view, each of the first middle lateral grooves 16 is connected to one of connection positions between the axially inner groove segments 5*i* and the oblique groove segments 5*s* of the first shoulder circumferential groove 5 so that the angle between the first middle lateral groove 16 and the axially inner groove segment 5*i* is an obtuse angle.

Further, each of the second middle lateral grooves 17 is connected to one of connection positions between the axially outer groove segments 80 and the oblique groove segments 8*s* of the second crown circumferential groove 8 so that the angle between the second middle lateral groove 17 and the axially outer groove segment 80 is an obtuse angle.

Similarly, each of the second middle lateral grooves 17 is connected to one of connection positions between the axially inner groove segments 6*i* and the oblique groove segments 6*s* of the second shoulder circumferential groove 6 so that the angle between the second middle lateral groove 17 and the axially inner groove segment 6*i* is an obtuse angle. Thereby, the mud performance can be further improved.

The first middle land portion 11 is provided with sipes 25.

The term "sipe" means a very narrow groove or cut whose main portion has a width of 1.5 mm or less between its two opposite sipe walls.

Here, the main portion means a portion where the two opposite sipe walls extend substantially parallel to each other in the tire radial direction.

The expression "substantially parallel" means that the angle formed between the two opposite sipe walls is 10 degrees or less.

Thereby, when ground pressure is applied to a tread rubber portion where the sipe is formed, the two sipe walls in the sipe main portion come into contact with each other, and the apparent rigidity of the tread rubber portion can be maintained.

In contrast, a groove in the general sense, namely, for drainage purpose means a groove whose two opposite walls do not come into contact with each other even when ground pressure is applied, to maintain a substantial drainage path. Therefore, the width of the groove is at least 2.0 mm.

In the present embodiment, the sipes 25 extend in the tire radial direction with a constant width.

However, the sipe 25 may have a chamfered portion formed on its edge(s) where the width is increased toward the radially outside.

Further, the sipe 25 may be provided with a so-called flask bottom in which the width is increased at the bottom.

The sipes 25 provided in the first middle land portion 11 in this example include a center sipe 26, an inner sipe 27, and an outer sipe 28.

The sipes 25 are inclined, for example, in a second direction with respect to the tire axial direction (downward sloe to the right in the figures of the present embodiment).

Thereby, the sipes 25 are inclined in an opposite direction to the first middle lateral groove 16 with respect to the tire axial direction.

The angles of the sipes 25 are, for example, 20 to 40 degrees with respect to the tire axial direction.

The center sipe 26 extends from the first crown circumferential groove 7 to the first shoulder circumferential groove 5.

Preferably, the center sipe 26 extends from the connection position between the first middle lateral groove 16 and the first crown circumferential groove 7 to the connection position between the first middle lateral groove 16 and the first shoulder circumferential groove 5.

Such center sipe 26 provides a large frictional force on muddy or rocky terrain, and is useful for improving off-road performance.

The inner sipe 27 extends from the first crown circumferential groove 7 and ends within the first middle land portion 11 without communicating with other grooves and sipes, for example.

The inner sipe 27 is connected to the connection position between the axially outer groove segment 70 and the oblique groove segment 7*s* of the first crown circumferential groove 7. In the present embodiment, the inner sipe 27 has an angular difference of 5 degrees or less from the center sipe 26. The angular difference is preferably zero, that is, these sipes are parallel with each other.

Further, the length of the inner sipe 27 is 50% or less, preferably 20% to 40% of the length of the center sipe 26. Such inner sipe 27 helps to improve the mud performance and steering stability in a well-balanced manner.

The outer sipe 28 extends from the first shoulder circumferential groove 5 and ends within the first middle land portion 11 without communicating with other grooves and sipes.

The outer sipe 28 is connected to the connection position between the axially inner groove segment 5*i* and the oblique groove segment 5*s* of the first shoulder circumferential groove 5.

In the present embodiment, the outer sipe 28 has an angular difference of 5 degrees or less from the center sipes 26. The angular difference is preferably zero, that is, these sipes are parallel with each other.

Further, the length of the outer sipe 28 is 50% or less, preferably 20% to 40% of the length of the center sipe 26.

The second middle land portion 12 is provided with sipes similar to the first middle land portion 11.

The sipes of the second middle land portion 12 have the same configurations as the sipes 25 provided in the first middle land portion 11, therefore, the above description for the sipes 25 of the first middle land portion 11 can also be applied to the sipes of the second middle land portion 12 mutatis mutandis, so the description will be omitted.

The crown land portion 10 is provided with a plurality of first crown lateral grooves 31 and a plurality of second crown lateral grooves 32.

The first crown lateral grooves 31 are connected to the first crown circumferential groove 7 at positions in the tire circumferential direction different from the positions at which the first middle lateral grooves 16 are connected to the first crown circumferential groove 7.

As a result, in the present embodiment, a T-junction formed by the first middle lateral groove 16 and the first crown circumferential groove 7 and a T-junction formed by the first crown lateral groove 31 and the first crown circumferential groove 7 are arranged alternately in the tire circumferential direction.

The second crown lateral grooves 32 are connected to the second crown circumferential groove 8 in the same way as the first crown lateral grooves 31 as described above.

In the present embodiment, the first crown lateral grooves 31 end within the crown land portion 10.

The length L7 in the tire axial direction of the first crown lateral groove 31 is 15% to 30% of the maximum width W4 in the tire axial direction of the crown land portion 10.

The angle of the first crown lateral groove 31 with respect to the tire axial direction is, for example, 10 degrees or less.

The second crown lateral grooves 32 are the same configuration as the first crown lateral grooves 31 as the tread pattern is point symmetrical.

In the developed view of the tread portion 2, as shown in FIG. 2, third virtual zones 23 which are formed by extending the first crown lateral grooves 31 in parallel with the tire axial direction to the first middle land portion 11 do not overlap with the first virtual zones 21 and the second virtual zones 22.

Further, in the developed view of the tread portion 2, the fourth virtual zones 24 which are formed by extending the second crown lateral grooves 32 in parallel with the tire axial direction to the first middle land portion 11 do not overlap with the first virtual zones 21 and the second virtual zones 22.

Such arrangement of the lateral grooves can improve wear resistance of the first middle land portion 11 and the crown land portion 10.

Figure 5:
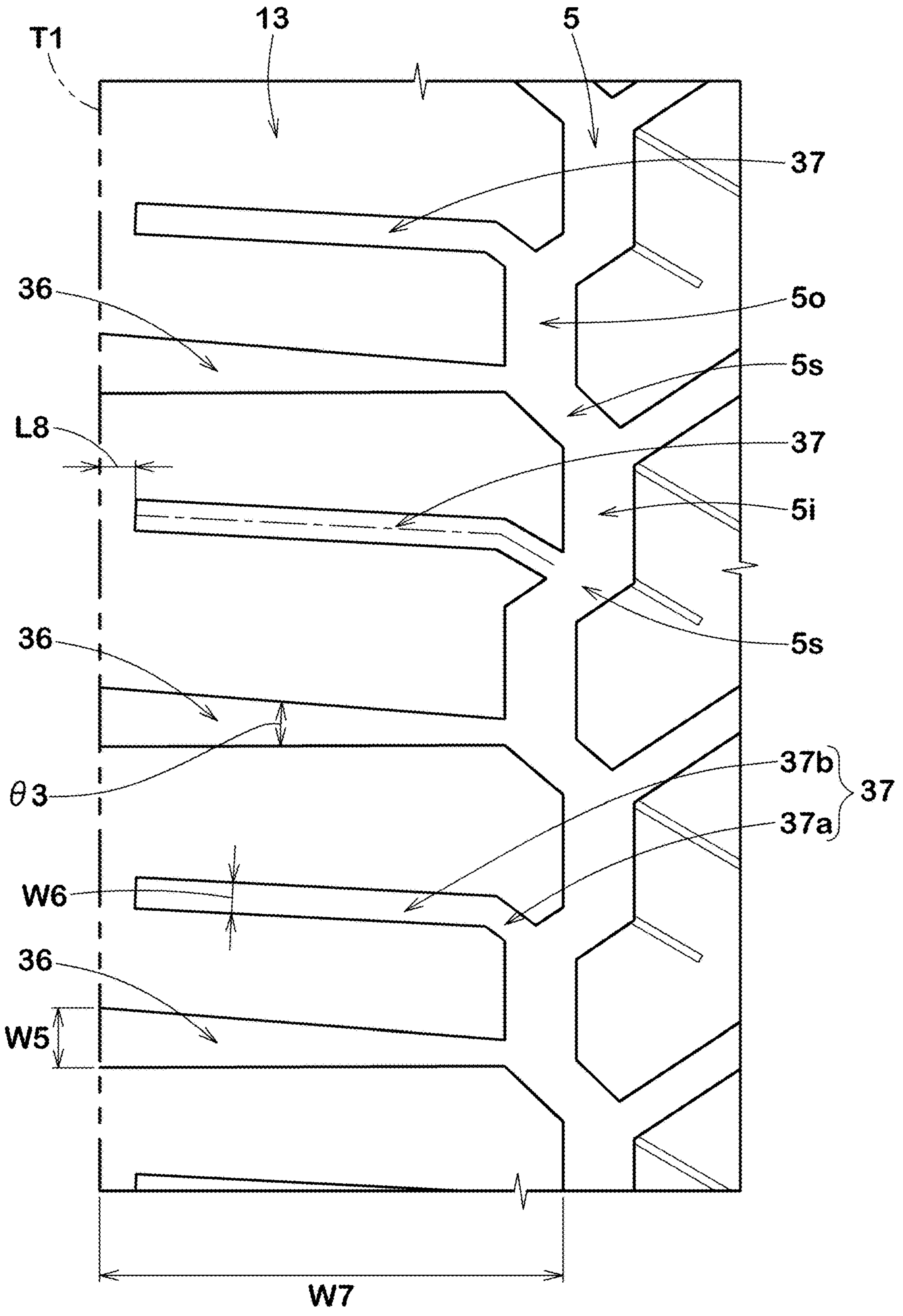
FIG. 5 is an enlarged partial view showing the first shoulder land portion in FIG. 1.

FIG. 5 is an enlarged partial view showing the first shoulder land portion 13. As shown, the first shoulder land portion 13 is provided with a plurality of transverse shoulder lateral grooves 36 and a plurality of non-transverse shoulder lateral grooves 37. In the present embodiment, these lateral grooves 36 and 37 are arranged alternately in the tire circumferential direction.

The transverse shoulder lateral groove 36 extends from the first shoulder circumferential groove 5 to the first tread edge T1.

The non-transverse shoulder lateral groove 37 extends axially outward from the first shoulder circumferential groove 5, and ends on the axially inside of the first tread edge T1.

The transverse shoulder lateral groove 36 is connected to a connection position between the axially outer groove segment 50 and the oblique groove segment 5*s* of the first shoulder circumferential groove 5.

In this example, the transverse shoulder lateral groove 36 has a groove width continuously increasing toward the first tread edge T1, and the angle θ3 formed between two groove edges of the transverse shoulder lateral groove 36 is 3 to 8 degrees for example.

Such transverse shoulder lateral groove 36 can quickly discharge mud that has gotten into the groove when running on muddy terrain, and helps to continuously exhibit excellent mud performance.

The transverse shoulder lateral groove 36 in this example is arranged at a smaller angle with respect to the tire axial direction than the angle θ2 of the first middle lateral groove 16.

The angle of the transverse shoulder lateral groove 36 is, for example, 5 degrees or less with respect to the tire axial direction.

Such transverse shoulder lateral grooves 36 is useful for improving traction performance of the tire on muddy terrain.

The non-transverse shoulder lateral groove 37 is connected to a connection position between the axially inner groove segment 5*i* and the oblique groove segment 5*s* of the first shoulder circumferential groove 5.

The non-transverse shoulder lateral groove 37 in this example is composed of a short groove segment 37*a* extending axially outward from the first shoulder circumferential groove 5, and a major groove segment 37*b* extending axially outward from the axially outer end of the short groove segment 37*a*.

The short groove segment 37*a* is inclined with respect to the tire axial direction to the second side S2.

The major groove segment 37*b* is inclined with respect to the tire axial direction to the second side S2 at a smaller angle than the short groove segment 37*a*.

The angle of the major groove segment 37*b* is, for example, 5 degrees or less with respect to the tire axial direction.

The non-transverse shoulder lateral groove 37 has a constant groove width W6 along its longitudinal direction.

The groove width W6 of the non-transverse shoulder lateral groove 37 is in a range from 40% to 60% of the groove width W5 of the transverse shoulder lateral groove 36 measured at the first tread edge T1.

Such non-transverse shoulder lateral groove 37 helps to improve the mud performance and steering stability in a well-balanced manner.

The distance L8 in the tire axial direction from the axially outer end of the non-transverse shoulder lateral groove 37 to the first tread edge T1 is 15% or less, for example, 5% to 10% of the maximum width W7 in the tire axial direction of the first shoulder land portion 13.

Such non-transverse shoulder lateral grooves 37 can suppress uneven wear and chipping-off of tread rubber around the first tread edge T1.

As shown in FIG. 1, the second shoulder land portion 14 has substantially the same configuration as the first shoulder land portion 13 described above since the tread pattern is point symmetrical. Therefore, the description of the first shoulder land portion 13 can be applied to the second shoulder land portion 14 mutatis mutandis, so the description will be omitted.

From the viewpoint of fully demonstrating mud performance, the land ratio of the tread portion 2 in the present embodiment is 60% to 80%, preferably 65% to 75%.

Here, the "land ratio" of a tread element means the ratio of the actual ground contacting area of the tread element to the overall area (inclusive of grooves and sipes) of the tread element.

The land ratio of the crown land portion 10 is, for example, 80% to 95%, preferably 90% to 95%.

The land ratios of the first middle land portion 11 and the second middle land portion 12 are, for example, 75% to 95%, preferably 80% to 90%.

The land ratios of the first shoulder land portion 13 and the second shoulder land portion 14 are, for example, 70% to 90%, preferably 75% to 85%.

Thereby, the mud performance and steering stability are improved in a well-balanced manner.

While detailed description has been made of a preferable embodiment of the present disclosure, the present disclosure can be embodied in various forms without being limited to the illustrated embodiment.

Statement of the Present Disclosure

The present disclosure is as follows.

[Present Disclosure 1]

A tire comprising:

a tread portion having a first tread edge and a second tread edge, and provided with four circumferential grooves disposed between the first and second tread edges and extending continuously in a tire circumferential direction so that the tread portion is axially divided into five land portions, wherein the four circumferential grooves are a first shoulder circumferential groove closest to the first tread edge, a second shoulder circumferential groove closest to the second tread edge, a first crown circumferential groove between the first shoulder circumferential groove and a tire equator, and a second crown circumferential groove between the second shoulder circumferential groove and the tire equator, the five land portions include a first middle land portion between the first shoulder circumferential groove and the first crown circumferential groove, a second middle land portion between the second shoulder circumferential groove and the second crown circumferential groove, and a crown land portion between the first crown circumferential groove and the second crown circumferential groove, the first middle land portion is provided with first middle lateral grooves extending across an entire axial width thereof, the second middle land portion is provided with second middle lateral grooves extending across an entire axial width thereof, each of the first middle lateral grooves and the second middle lateral grooves is inclined with respect to the tire axial direction so as to have a first end on a first side in the tire circumferential direction and a second end on a second side in the tire circumferential direction, in a plan view of the tread portion, the first ends of the first middle lateral grooves respectively overlap first virtual zones formed by extending the second ends of the second middle lateral groove to the first middle land portion in parallel with the tire axial direction, and the second ends of the first middle lateral grooves respectively overlap second virtual zones formed by extending the first ends of the second middle lateral grooves to the first middle land portion in parallel with the tire axial direction.

[Present Disclosure 2]

The tire according to Present Disclosure 1, wherein the first middle lateral grooves and the second middle lateral grooves are each inclined at an angle of from 20 to 60 degrees with respect to the tire axial direction.

[Present Disclosure 3]

The tire according to Present Disclosure 1 or 2, wherein the overlapping length in the tire circumferential direction of the first end of the first middle lateral groove with the first virtual zone is 30% to 100% of the length in the tire circumferential direction of the first virtual zone.

[Present Disclosure 4]

The tire according to Present Disclosure 1, 2 or 3, wherein the overlapping length in the tire circumferential direction of the second end of the first middle lateral groove with the second virtual zone is 30% to 100% of the length in the tire circumferential direction of the second virtual zone.

[Present Disclosure 5]

The tire according to any one of Present Disclosures 1 to 4, wherein a distance in the tire axial direction from the tire equator to the center line of the first crown circumferential groove is 5% to 20% of a half tread width which is the distance in the tire axial direction from the tire equator to the first tread edge.

[Present Disclosure 6]

The tire according to any one of Present Disclosures 1 to 5, wherein a distance in the tire axial direction from the tire equator to the center line of the second crown circumferential groove is 5% to 20% of a half tread width which is the distance in the tire axial direction from the tire equator to the first tread edge. [Present Disclosure 7] The tire according to any one of Present Disclosures 1 to 6, wherein the groove width of the first middle lateral groove is 5% to 20% of an average value of pitch lengths in the tire circumferential direction of the first middle lateral grooves.

[Present Disclosure 8]

The tire according to any one of Present Disclosures 1 to 7, wherein the groove width of the second middle lateral groove is 5% to 20% of an average value of pitch lengths in the tire circumferential direction of the second middle lateral grooves.

[Present Disclosure 9]

The tire according to any one of Present Disclosures 1 to 8, wherein a land ratio of the crown land portion is 80% to 95%.

[Present Disclosure 10]

The tire according to any one of Present Disclosures 1 to 9, wherein the first crown circumferential groove and the second crown circumferential groove each extend in a zigzag shape in the tire circumferential direction.

[Present Disclosure 11]

The tire according to Present Disclosure 10, wherein the first crown circumferential groove has a zigzag shape and comprises:

axially inner groove segments extending linearly in the tire circumferential direction;

axially outer groove segments extending linearly in the tire circumferential direction; and oblique groove segments connecting between the axially inner groove segments and the axially outer groove segments, and each of the first middle lateral grooves is connected to one of connection positions between the axially outer groove segments and the oblique groove segments of the first crown circumferential groove so that an angle formed between the first middle lateral groove and the axially outer groove segment is an obtuse angle.

[Present Disclosure 12]

The tire according to Present Disclosure 10 or 11, wherein the second crown circumferential groove has a zigzag shape and comprises: axially inner groove segments extending linearly in the tire circumferential direction; axially outer groove segments extending linearly in the tire circumferential direction; and oblique groove segments connecting between the axially inner groove segments and the axially outer groove segments, and each of the second middle lateral grooves is connected to one of connection portions between the axially outer groove segments and the oblique groove segments of the second crown circumferential groove so that an angle formed between the second middle lateral groove and the axially outer groove segment is an obtuse angle.

[Present Disclosure 13]

The tire according to any one of Present Disclosures 1 to 12, wherein the crown land portion is provided with a plurality of first crown lateral grooves connected to the first crown circumferential groove, and in a plan view of the tread portion, third virtual zones formed by extending the first crown lateral grooves to the first middle land portion in parallel with the tire axial direction do not overlap with the first virtual zones and the second virtual zones.

[Present Disclosure 14]

The tire according to any one of Present Disclosures 1 to 13, wherein the crown land portion is provided with a plurality of second crown lateral grooves connected to the second crown circumferential groove, and in a plan view of the tread portion, fourth virtual zones formed by extending the second crown lateral grooves to the first middle land portion in parallel with the tire axial direction do not overlap with the first virtual zones and the second virtual zones.

DESCRIPTION OF THE REFERENCE SIGNS

2 tread portion
3 circumferential groove
4 land portion
5 first shoulder circumferential groove
6 second shoulder circumferential groove
7 first crown circumferential groove
8 second crown circumferential groove
10 crown land portion
11 first middle land portion
12 second middle land portion
16 first middle lateral groove
17 second middle lateral groove
21 first virtual zone
22 second virtual zone
T1 first tread edge
T2 second tread edge

The invention claimed is:

1. A tire comprising:

a tread portion having a first tread edge and a second tread edge, and provided with four circumferential grooves disposed between the first and second tread edges and extending continuously in a tire circumferential direction so that the tread portion is axially divided into five land portions, wherein the four circumferential grooves are a first shoulder circumferential groove closest to the first tread edge, a second shoulder circumferential groove closest to the second tread edge, a first crown circumferential groove between the first shoulder circumferential groove and a tire equator, and a second crown circumferential groove between the second shoulder circumferential groove and the tire equator, the first crown circumferential groove has a zigzag shape and comprises axially inner groove segments extending linearly in the tire circumferential direction, axially outer groove segments extending linearly in the tire circumferential direction, and oblique groove segments connecting between the axially inner groove segments and the axially outer groove segments, the second crown circumferential groove has a zigzag shape and comprises axially inner groove segments extending linearly in the tire circumferential direction, axially outer groove segments extending linearly in the tire circumferential direction, and oblique groove segments connecting between the axially inner groove segments and the axially outer groove segments, the five land portions include a first middle land portion between the first shoulder circumferential groove and the first crown circumferential groove, a second middle land portion between the second shoulder circumferential groove and the second crown circumferential groove, a crown land portion between the first crown circumferential groove and the second crown circumferential groove, a first shoulder land portion between the first shoulder circumferential groove and the first tread edge, and a second shoulder land portion between the second shoulder circumferential groove and the second tread edge, the first middle land portion is provided with first middle lateral grooves extending across an entire axial width thereof, each of the first middle lateral grooves is connected to one of connection positions between the axially outer groove segments and the oblique groove segments of the first crown circumferential groove, the second middle land portion is provided with second middle lateral grooves extending across an entire axial width thereof, each of the second middle lateral grooves is connected to one of connection portions between the axially outer groove segments and the oblique groove segments of the second crown circumferential groove, each of the first middle lateral grooves and the second middle lateral grooves is inclined with respect to the tire axial direction so as to have a first end on a first side in the tire circumferential direction and a second end on a second side in the tire circumferential direction, in a plan view of the tread portion, a first virtual zone formed by extending the second end of each second middle lateral groove to the first middle land portion in parallel with the tire axial direction overlaps with the first end of one of the first middle lateral grooves, and a second virtual zone formed by extending the first end of the each second middle lateral groove to the first middle land portion in parallel with the tire axial direction overlaps with the second end of one of the first middle lateral grooves which is adjacent in the tire circumstantial direction to the one of the first middle lateral grooves, the first middle land portion is provided with sipes each inclined to an opposite direction to the first middle lateral grooves with respect to the tire axial direction at an angle in a range from 20 to 40 degrees with respect to the tire axial direction, the sipes include a center sipe extending from the first crown circumferential groove to the first shoulder circumferential groove, an inner sipe extending from the first crown circumferential groove and ending within the first middle land portion, and an outer sipe extending from the first shoulder circumferential groove and ending within the first middle land portion, the inner sipe has an angular difference of 5 degrees or less from the center sipe, and the outer sipe has an angular difference of 5 degrees or less from the center sipe.

2. The tire according to claim 1, wherein the first middle lateral grooves and the second middle lateral grooves are each inclined at an angle of from 20 to 60 degrees with respect to the tire axial direction.

3. The tire according to claim 1, wherein an overlapping length in the tire circumferential direction of the first end of the first middle lateral groove with the first virtual zone is 30% to 100% of the length in the tire circumferential direction of the first virtual zone.

4. The tire according to claim 3, wherein an overlapping length in the tire circumferential direction of the second end of the first middle lateral groove with the second virtual zone is 30% to 100% of the length in the tire circumferential direction of the second virtual zone.

5. The tire according to claim 1, wherein a distance in the tire axial direction from the tire equator to the center line of the first crown circumferential groove is 5% to 20% of a half tread width which is the distance in the tire axial direction from the tire equator to the first tread edge.

6. The tire according to claim 5, wherein a distance in the tire axial direction from the tire equator to the center line of the second crown circumferential groove is 5% to 20% of a half tread width which is the distance in the tire axial direction from the tire equator to the first tread edge.

7. The tire according to claim 1, wherein a groove width of the first middle lateral groove is 5% to 20% of an average value of pitch lengths in the tire circumferential direction of the first middle lateral grooves.

8. The tire according to claim 7, wherein a groove width of the second middle lateral groove is 5% to 20% of an average value of pitch lengths in the tire circumferential direction of the second middle lateral grooves.

9. The tire according to claim 1, wherein a land ratio of the crown land portion is 80% to 95%.

10. The tire according to claim 1, wherein each of the first middle lateral grooves is connected to the one of the connection positions between the axially outer groove segments and the oblique groove segments of the first crown circumferential groove so that an angle formed between the first middle lateral groove and the axially outer groove segment is an obtuse angle, and each of the second middle lateral grooves is connected to the one of the connection portions between the axially outer groove segments and the oblique groove segments of the second crown circumferential groove so that an angle formed between the second middle lateral groove and the axially outer groove segment is an obtuse angle.

11. The tire according to claim 1, wherein the crown land portion is provided with a plurality of first crown lateral grooves connected to the first crown circumferential groove, and in a plan view of the tread portion, third virtual zones formed by extending the first crown lateral grooves to the first middle land portion in parallel with the tire axial direction do not overlap with the first virtual zones and the second virtual zones.

12. The tire according to claim 11, wherein the crown land portion is provided with a plurality of second crown lateral grooves connected to the second crown circumferential groove, and in a plan view of the tread portion, fourth virtual zones formed by extending the second crown lateral grooves to the first middle land portion in parallel with the tire axial direction do not overlap with the first virtual zones and the second virtual zones.

13. The tire according to claim 1, wherein the first middle lateral grooves and the second middle lateral grooves are inclined in the same direction.

14. The tire according to claim 13, wherein each of the first middle lateral grooves and the second middle lateral grooves is a straight groove.

15. The tire according to claim 14, wherein each of the first middle lateral grooves and the second middle lateral grooves has a constant groove width.

16. The tire according to claim 1, wherein the crown land portion is provided with a plurality of first crown lateral grooves, the first crown lateral grooves are connected to the first crown circumferential groove at positions in the tire circumferential direction different from positions at which the first middle lateral grooves are connected to the first crown circumferential groove, whereby a T-junction formed by the respective first middle lateral groove and the first crown circumferential groove and a T-junction formed by the respective first crown lateral groove and the first crown circumferential groove are arranged alternately in the tire circumferential direction.

17. A tire comprising:

a tread portion having a first tread edge and a second tread edge, and provided with four circumferential grooves disposed between the first and second tread edges and extending continuously in a tire circumferential direction so that the tread portion is axially divided into five land portions, wherein the four circumferential grooves are a first shoulder circumferential groove closest to the first tread edge, a second shoulder circumferential groove closest to the second tread edge, a first crown circumferential groove between the first shoulder circumferential groove and a tire equator, and a second crown circumferential groove between the second shoulder circumferential groove and the tire equator, the first crown circumferential groove has a zigzag shape and comprises axially inner groove segments extending linearly in the tire circumferential direction, axially outer groove segments extending linearly in the tire circumferential direction, and oblique groove segments connecting between the axially inner groove segments and the axially outer groove segments, the second crown circumferential groove has a zigzag shape and comprises axially inner groove segments extending linearly in the tire circumferential direction, axially outer groove segments extending linearly in the tire circumferential direction, and oblique groove segments connecting between the axially inner groove segments and the axially outer groove segments, the five land portions include a first middle land portion between the first shoulder circumferential groove and the first crown circumferential groove, a second middle land portion between the second shoulder circumferential groove and the second crown circumferential groove, a crown land portion between the first crown circumferential groove and the second crown circumferential groove, a first shoulder land portion between the first shoulder circumferential groove and the first tread edge, and a second shoulder land portion between the second shoulder circumferential groove and the second tread edge, the first middle land portion is provided with first middle lateral grooves extending across an entire axial width thereof, each of the first middle lateral grooves is connected to one of connection positions between the axially outer groove segments and the oblique groove segments of the first crown circumferential groove, the second middle land portion is provided with second middle lateral grooves extending across an entire axial width thereof, each of the second middle lateral grooves is connected to one of connection portions between the axially outer groove segments and the oblique groove segments of the second crown circumferential groove, each of the first middle lateral grooves and the second middle lateral grooves is inclined with respect to the tire axial direction so as to have a first end on a first side in the tire circumferential direction and a second end on a second side in the tire circumferential direction, in a plan view of the tread portion, a first virtual zone formed by extending the second end of each second middle lateral groove to the first middle land portion in parallel with the tire axial direction overlaps with the first end of one of the first middle lateral grooves, and a second virtual zone formed by extending the first end of the each second middle lateral groove to the first middle land portion in parallel with the tire axial direction overlaps with the second end of one of the first middle lateral grooves which is adjacent in the tire circumstantial direction to the one of the first middle lateral grooves, the first shoulder land portion is provided with transverse shoulder lateral grooves and non-transverse shoulder lateral grooves arranged alternately in the tire circumferential direction, the transverse shoulder lateral grooves each extend from the first shoulder circumferential groove to the first tread edge, the non-transverse shoulder lateral grooves each extend axially outwardly from the first shoulder circumferential groove and end on the axially inside of the first tread edge, each of the non-transverse shoulder lateral grooves has a constant groove width along its longitudinal direction, and the constant groove width is in a range from 40% to 60% of a groove width of the respective transverse shoulder lateral groove measured at the first tread edge.

18. The tire according to claim 17, wherein a distance in the tire axial direction from the first tread edge to the end of each non-transverse shoulder lateral groove is not more than 15% of a maximum width in the tire axial direction of the first shoulder land portion.

* * * * *